Oct. 27, 1953
R. O. HOOKER
2,656,610
DEVICE FOR DETERMINING THE DEPTH OF WATER
OF A PREDETERMINED TEMPERATURE
Filed Jan. 14, 1952
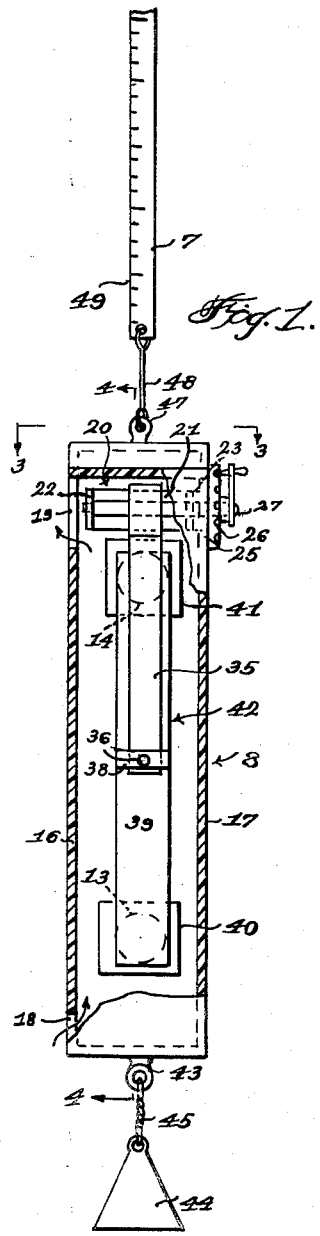
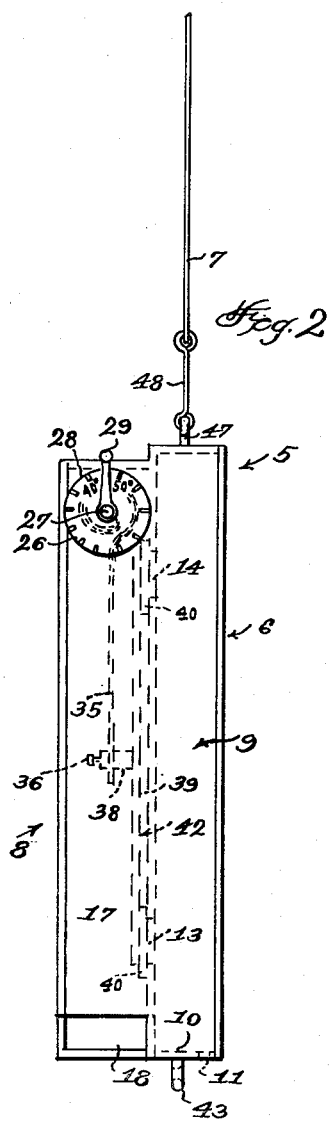
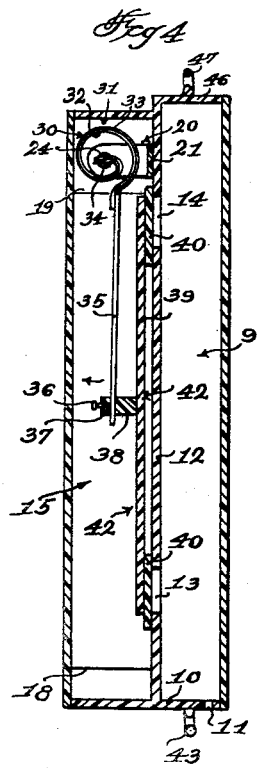
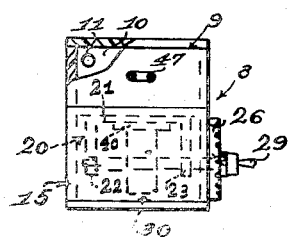
Inventor
RAY O. HOOKER
By *John N. Randolph*

Patented Oct. 27, 1953

2,656,610

UNITED STATES PATENT OFFICE 2,656,610

DEVICE FOR DETERMINING THE DEPTH OF WATER OF A PREDETERMINED TEMPERATURE

Ray O. Hooker, San Fernando, Calif.

Application January 14, 1952, Serial No. 266,350

7 Claims. (Cl. 33—126.5)

1

This invention relates to a device of extremely simple construction and which may be accurately and efficiently employed for determining the depth of water of a predetermined temperature.

It is a well known fact that fish follow water of a certain temperature or within a certain temperature range, which will hereinafter be referred to as a water stratum, having a temperature within a predetermined range. Furthermore, the depth of this temperature stratum may vary considerably due to tides, currents and other conditions below the surface of the water, so that it is extremely difficult to determine the depth of a desired temperature stratum for accurately positioning baited fishing hooks and fishing lures at a proper depth to be in water of a desired temperature where fish are most likely to be caught.

Accordingly, it is an object of the present invention to provide a device of extremely simple construction which may be readily employed by a fisherman for accurately determining the depth of a particular temperature stratum of the water to thereby determine at what depth the baited fishhooks and lures should be disposed for most successful fishing.

A further object of the invention is to provide a device which may be readily set for determining the depth of water strata of different desired temperatures.

Various other objects and advantages of the invention will hereinafter become more fully apparent from the following description of the drawing, illustrating one presently preferred embodiment thereof, and wherein:

Figure 1 is a front elevational view partly in vertical section of the invention;

Figure 2 is a side elevational view thereof looking from right to left of Figure 1;

Figure 3 is a horizontal sectional view taken substantially along a plane as indicated by the line 3—3 of Figure 1, and Figure 4 is a central vertical sectional view taken substantially along a plane as indicated by the line 4—4 of Figure 1.

Referring more specifically to the drawing, the device for determining the depth of a water stratum of a particular temperature is designated generally 5 and includes a thermostatically controlled unit, designated generally 6, and a supporting device therefor, designated 7.

The thermostatically controlled unit 6 comprises an elongated box like structure 8, which may be formed of any suitable material, as for example a plastic and which includes an elongated chamber, designated generally 9, which extends from end-to-end of the structure 8 and which includes a bottom wall 10 provided with a small port or opening 11 and an inner side wall 12, as best seen in Figure 4, which is provided with two longitudinally spaced openings 13 and 14,

2 one of which is located adjacent the bottom of the chamber 9 and the other of which is located near the top thereof. The chamber 9 is airtight except for the openings 11, 13 and 14 and accordingly the box structure 8, or at least a part thereof comprising the chamber 9 must be formed of a material which is impervious to air and water.

The box structure 8 also includes an outer housing portion, designated generally 15, having an inner wall defined by the wall 12 and which includes side walls 16 and 17, which extend outwardly from the inner wall 12. The bottom part of the housing 15 is provided with at least one opening 18, which may be formed in any part thereof, and the upper part of the housing 15 is provided likewise with at least one opening 19, which also may be formed in any part thereof.

A bearing unit, designated generally 20, includes an intermediate base portion 21 which is disposed in the upper part of the housing 15 and secured to the wall 12 and transversely thereof. The said bearing unit 20 includes outwardly extending bearing members 22 and 23, which are disposed between and parallel to the walls 16 and 17 and which journal spaced portions of a shaft 24, one end of which extends outwardly through an opening 25 in the upper portion of the side wall 17 and through a calibrated disc 26, in which said shaft end 27 is turnably mounted. The calibrated disc 26 is secured to the outer side of the wall 17 and is provided on its outer face with graduations and degree markings 28. A crank 29 which is secured to the shaft end 27, outwardly of the disc 26, forms a pointer which functions with the indicia 28. The shaft 24 forms a part of a thermostat, designated generally 30, including a bimetallic coil or loop 31 composed of an inner ply 32 and an outer ply 33. The plies 32 and 33 are suitably secured together and are formed of dissimilar metals which expand and contract differently when subjected to heat and cold, respectively, such as brass and steel. The inner end of the coil 31 is anchored in a slot 34 of the shaft 24 between the bearing elements 22 and 23. An arm 35 forms an extension of the outer, depending end of the coil 31 and extends downwardly therefrom and is secured adjacent its lower, free end by a setscrew 36 in a slot 37 of a block 38. The block 38 is secured to the outer side of a bar 39, intermediate of the ends of said bar, and a pair of small plates 40 and 41 are secured to the inner side of the bar 39 at the ends thereof and are disposed to close the openings 13 and 14, respectively, when the bar 39 is in its position of Figure 4. The bar 39 and plates 40 and 41 together with the block 38 which is secured thereto form a valve, designated generally 42.

An eye 43 is fixed to and depends from the bottom wall 10 so that if the box structure 8 is formed of a buoyant material, a sinker 44 may be suspended therebeneath by a fastening element 45 attached to the sinker and to the eye 43. The top wall 46 of the chamber 9 has an eye 47 fixed to the outer side thereof. A link 48 connects the eye 47 to one end of the raising and lowering member 7 which is preferably in the form of a flexible tape or strip having suitable linear indicia 49 on one or both sides thereof.

Assuming that it has been determined that fish swim in a water stratum where the temperature is 45°, the shaft 24 is turned by the crank 29 until the said crank is disposed as a pointer over the 45° F. graduation of the indicia 28 for setting the thermostat 30 to open the valve 42 at a temperature of 45°. Before this setting is accomplished, with the valve 42 in an open position, water is permitted to drain from the chamber 9 through the drain opening 11 and when the thermostat is set the valve 42 is closed so that the plates 40 and 41 will close and seal the openings 13 and 14, respectively. The unit 6 is then lowered into the water by the tape or flexible member 7 and if non-buoyant is caused to move toward the bottom by its own weight or if buoyant is pulled downwardly by the sinker 44. The unit 6 is permitted to descend slowly into the water by paying out the tape or flexible member 7 gradually. When the unit 6 reaches a water stratum of 45° Fahrenheit, the thermostat 30 will contract causing the arm 35 to swing away from the chamber 9 to displace the valve 42 away from the wall 12 to thus expose the openings 13 and 14. As water has entered the housing structure 15 through the openings 18 and 19, water will enter the chamber 9 predominately through the opening 13 and the air therein will escape therefrom through the opening 14 into the housing 15 and from said housing through its opening 19. This air will rise as bubbles to the surface of the water indicating to the operator that the unit 6 has reached a water stratum of 45°. The operator can then measure the depth of the unit 6 and accordingly of the water stratum by the linear graduation of the tape 7 which is located at the surface of the water, and fishing lines may then be lowered to locate baited hooks or lures at the same depth and so that the hooks or lures will be in the 45° temperature water stratum followed by the fish and where a catch is most likely to result. The unit 6 may then be raised by the tape or flexible member 7 and the water allowed to drain from the chamber 9 through the drain port 11, preparatory to the next time that the device 5 is required for locating a water stratum of a desired temperature.

Various modifications and changes are contemplated and may obviously be resorted to, without departing from the spirit or scope of the invention as hereinafter defined by the appended claims.

I claim as my invention:

1. A device for determining the depth of a water stratum of a particular temperature comprising a box-like structure including an air chamber and a housing, said air chamber having a wall provided with an opening, a thermally responsive means of the loop type mounted in the housing, an arm fixed to and projecting from the outer end of the loop of the thermally responsive means, a valve connected to and supported by said arm and normally disposed for closing the opening of the air chamber wall, and a raising and lowering element connected to and suspending said box-like structure for lowering it into the water whereby when the box-like structure reaches a water stratum of a particular temperature the arm will be actuated by the thermally responsive means for displacing the valve away from the air chamber to uncover the opening thereof to permit the air to escape therefrom to rise to the surface of the water for indicating the location of the box-like structure in the water stratum of a desired temperature.

2. A device as in claim 1, the said air chamber wall having a second opening, said openings being disposed near the upper and lower ends of the air chamber when suspended by the raising and lowering element, and said valve comprising a bar having a plate at each end thereof, said plates being positioned to close said openings.

3. A device as in claim 1, said housing having at least one opening adjacent each end thereof for admitting water to the thermally responsive means and to the air chamber and for the escape of air through the box-like structure from the air chamber.

4. A device as in claim 1, said box-like structure being elongated, a bearing unit secured in the housing transversely of the longitudinal axis of the box-like structure, a shaft journalled in the bearing unit and forming a part of the thermally responsive means and in which the inner end of the bimetallic loop is secured, and means for turning said shaft to adjust said thermally responsive means for opening the valve at different temperatures.

5. A device as in claim 4, and means bearing temperature graduations associated with a portion of the shaft and with the said means for turning the shaft for indicating the temperature at which the thermally responsive means is set to displace the valve to an open position.

6. In a device for determining the depth of a water stratum of a particular temperature, an elongated housing structure having an upper end and a lower end and an opening adjacent each end thereof, an elongated air chamber secured to the housing structure having at least one opening therein formed in a wall thereof and spaced from the lower end of said air chamber, a bimetallic loop type thermally responsive means supported in said housing and having an arm secured to and projecting from an outer end of a loop thereof, a valve secured to said arm and normally supported thereby in a position to close the air chamber opening, and means provided with linear markings connected to and suspending the housing, said valve being displaced out of engagement with the air chamber opening when the thermally responsive means is contracted to permit air to escape from the air chamber for indicating that the air chamber and housing are located in a water stratum of a particular temperature.

7. A device for determining a water stratum depth as in claim 6, said air chamber having a port in the lower end thereof for draining the water therefrom when the device is removed from the water.

RAY O. HOOKER.

References Cited in the file of this patent

UNITED STATES PATENTS

| Number | Name | Date |
|---|---|---|
| 466,128 | Rung | Dec. 29, 1891 |
| 959,633 | Sommer | May 31, 1910 |
| 2,302,536 | Edwards | Nov. 17, 1942 |